US006190089B1

United States Patent
Bennett, Jr. et al.

(10) Patent No.: US 6,190,089 B1
(45) Date of Patent: Feb. 20, 2001

(54) DEEP DRAFT SEMI-SUBMERSIBLE OFFSHORE STRUCTURE

(75) Inventors: William T. Bennett, Jr., Metairie; Alden J. Laborde, New Orleans, both of LA (US)

(73) Assignee: Mindoc, LLC, Houma, LA (US)

( * ) Notice: Under 35 U.S.C. 154(b), the term of this patent shall be extended for 0 days.

(21) Appl. No.: 09/071,819

(22) Filed: May 1, 1998

(51) Int. Cl.$^7$ .................................................. B63B 35/44
(52) U.S. Cl. .................. 405/200; 114/256; 114/264; 405/195.1
(58) Field of Search ................. 405/195.1, 196, 405/200, 204, 205, 206, 207, 210, 211, 223.1, 224, 224.2; 114/256, 264, 265, 266

(56) References Cited

U.S. PATENT DOCUMENTS

| | | |
|---|---|---|
| 3,434,293 | 3/1969 | Brown . |
| 3,522,709 | 8/1970 | Vilain ..................................... 61/46.5 |
| 3,626,701 | 12/1971 | Laffont ................................... 61/46.5 |
| 3,648,638 | 3/1972 | Blenkarn ........................... 114/0.5 D |
| 3,654,886 | 4/1972 | Silverman ......................... 114/0.5 D |
| 3,922,868 | 12/1975 | McDonald et al. ................... 61/46.5 |
| 3,982,492 * | 9/1976 | Steddum ............................ 405/223.1 |
| 4,098,333 | 7/1978 | Wells et al. ............................ 166/0.5 |
| 4,155,670 | 5/1979 | Stafford ................................ 405/202 |
| 4,234,270 | 11/1980 | Gherde et al. ........................ 405/202 |
| 4,284,367 | 8/1981 | Tuson et al. .......................... 405/202 |
| 4,566,824 | 1/1986 | Minier et al. ......................... 405/202 |
| 4,606,673 | 8/1986 | Daniell ................................ 405/210 |
| 4,626,136 | 12/1986 | Gunderson .......................... 405/224 |
| 4,648,469 | 3/1987 | Biggs et al. ............................. 175/7 |
| 4,685,833 | 8/1987 | Wwamoto ........................... 405/195 |
| 4,702,321 * | 10/1987 | Horton ................................ 166/350 |
| 4,740,109 | 4/1988 | Horton ................................ 405/224 |
| 4,766,836 * | 8/1988 | Behar et al. .......................... 114/256 |
| 4,813,815 | 3/1989 | McGehee ............................. 405/202 |
| 4,893,965 | 1/1990 | Jordan et al. ......................... 405/202 |
| 4,895,481 * | 1/1990 | Pepin-Lehalleur et al. ......... 405/224 |
| 4,906,139 * | 3/1990 | Chiu et al. ......................... 405/223.1 |
| 5,007,225 | 4/1991 | Teasdale . |
| 5,044,450 | 9/1991 | Aso et al. ................................. 175/7 |
| 5,044,828 | 9/1991 | Berner et al. ........................ 405/202 |
| 5,683,206 * | 11/1997 | Copple .............................. 405/223.1 |

FOREIGN PATENT DOCUMENTS

| | | |
|---|---|---|
| 1277800 | 6/1972 | (GB) . |
| WO 8401554 | 2/1984 | (WO) . |
| WO 8701748 | 3/1987 | (WO) . |

OTHER PUBLICATIONS

Oil & Gas Journal—Jun. 22, 1998—3 pages "Patents protect deepwater platform concepts".

* cited by examiner

Primary Examiner—Eileen D. Lillis
Assistant Examiner—Frederick L. Lagman
(74) Attorney, Agent, or Firm—Keaty Professional Law Corporation

(57) ABSTRACT

A deep draft semi-submersible offshore structure suitable for conducting mineral exploration and production operations in deep waters of the oceans. The structure uses three or more caissons or columns equidistantly spaced from adjacent columns. The weight distribution and provision of liquid or solid permanent balance in the lower ends of each column make the structure stable without reliance upon water line displacement or tendons, as compared to conventional vessels. The center of gravity of the structure is maintained below its center of buoyancy, thus imparting an inherent absolute stability to the structure. The columns are retained in spaced relationship to each other by a plurality of horizontal braces or a combination of horizontal braces and diagonal braces. The major part of the structure is positioned below the water surface at sufficient depth to minimize the reaction to surface changes, thereby greatly reducing heave and angular response to surface wave action.

5 Claims, 5 Drawing Sheets

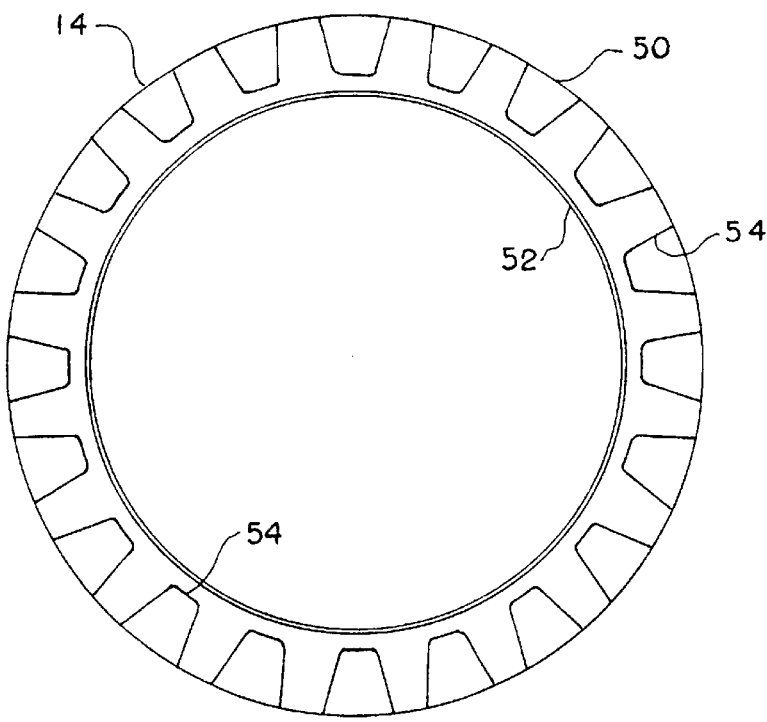
FIG. 6
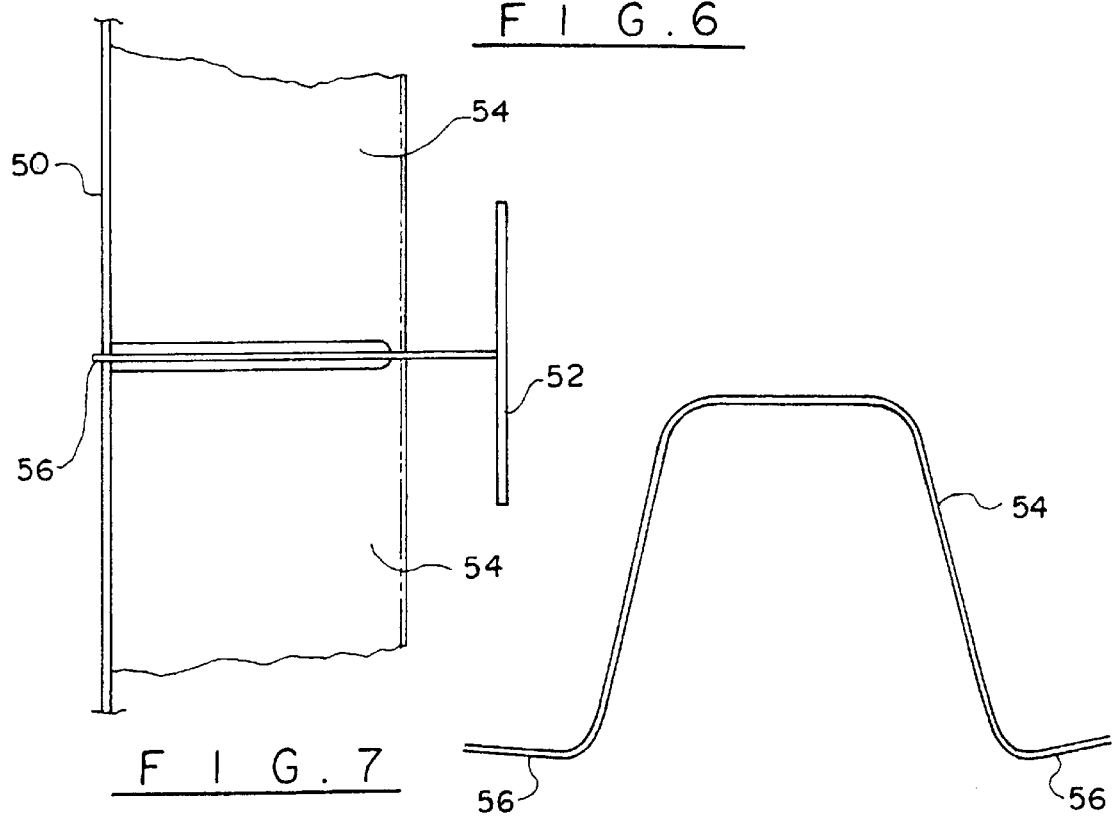
FIG. 7
FIG. 5

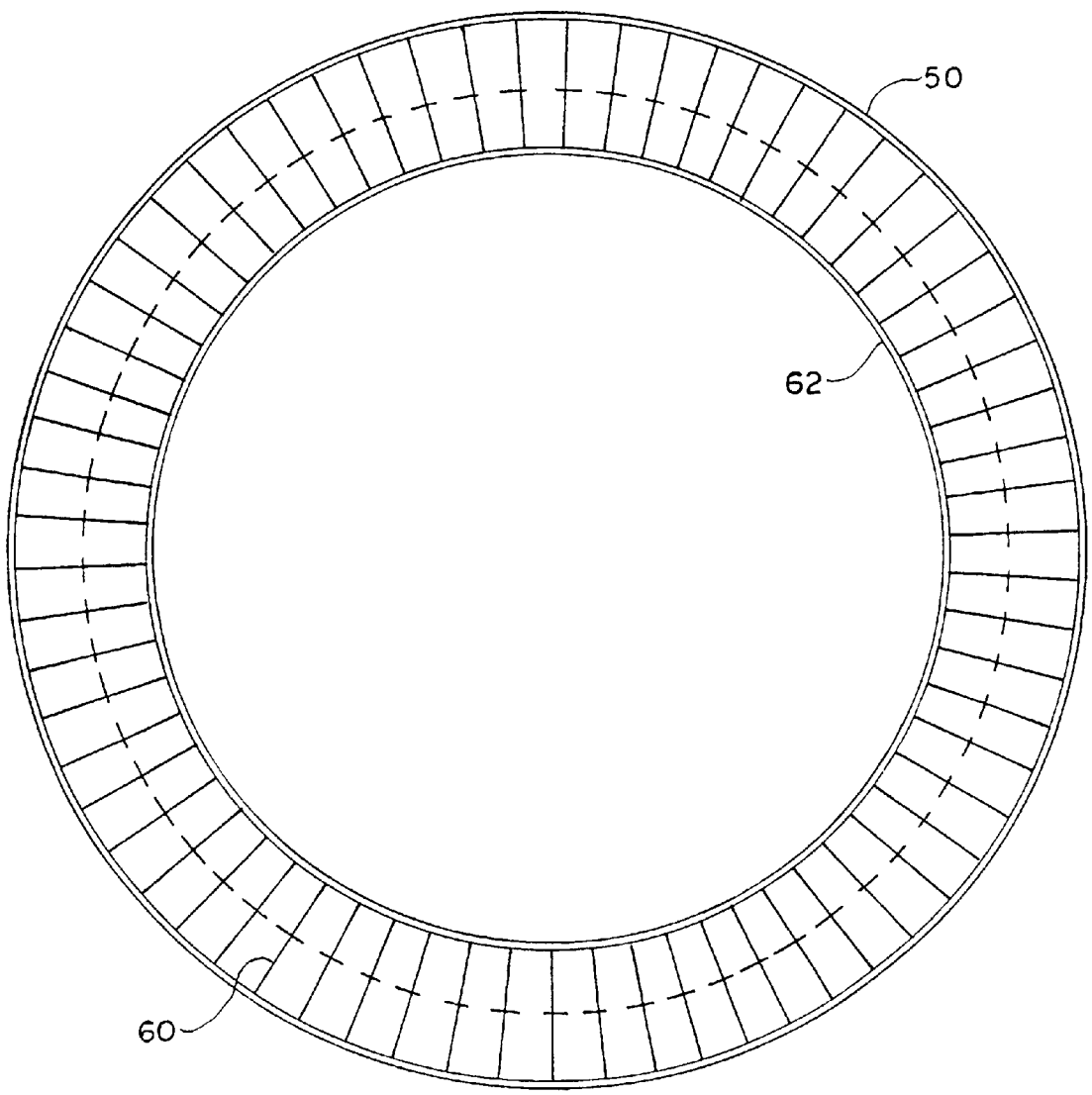
F I G. 8
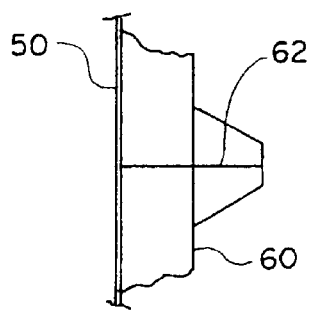
F I G. 9

DEEP DRAFT SEMI-SUBMERSIBLE OFFSHORE STRUCTURE

BACKGROUND OF THE INVENTION

The invention relates to a semi-submersible floating offshore structure suitable for use in deep waters for supporting, for instance oil and gas drilling and production operations.

In recent years, various types of structures have been developed for use in oil and gas exploration in waters more and more distant from shore, demanding vessel designs that can operate in deep waters, preferably free standing offshore platforms and floating vessels. Some of the known designs use fixed bottom supported structures, with legs embedded into the ocean floor, while others provide for drilling from floating structures, particularly in deeper water.

Currently available floating designs include drill ships, conventional semi-submersible units, as well as tension leg platforms. All of these design approaches have advantages, as well as apparent disadvantages. For instance, drill ships have poor motion characteristics, particularly in quartering or beam sea conditions; conventional semi-submersible vessels are expensive to fabricate and are sensitive to topside changes in weights, wave and wind forces and direction; fixed platforms cannot be moved from one location to another and therefore are considered a poor economic investment for small field production in deep waters. Tension leg platforms are very sensitive to changes in topside weights and area and require permanent type footings on the sea floor, which cannot be easily moved.

All structures are exposed to ocean waves, and it is common knowledge that conventional vessels exhibit substantial amounts of vertical heave, horizontal surge and angular roll and pitch motions. The heave and roll motion is partially alleviated by semi-submersible vessels, which are supported by buoyant floatation columns, tanks and damping action of the submerged pontoons. However, a conventional semi-submersible vessel requires a larger water plane area at the water line in order to maintain positive stability, thus making it more responsive to surface waves and winds. Tension leg platforms reduce heave and roll motions but require strong mooring tendons to resist the vertical and lateral forces acting upon them.

The present invention contemplates reducing or eliminating many of the drawbacks associated with other conventional deep water structures, and providing a mobile, stable structure, having superior motion characteristics and reduced response to wind and wave forces.

SUMMARY OF THE INVENTION

It is, therefore, an object of the present invention to provide a deep draft semi-submersible offshore structure with inherent absolute stability and minimum movement.

It is another object of the present invention to provide a deep water semi-submersible vessel for offshore drilling and production operations.

A further object of the present invention is to provide a mobile offshore structure that can be conveniently relocated to a different location, as may be required.

These and other objects of the invention are achieved through a provision of a deep draft semi-submersible offshore structure for conducting offshore operations, such as drilling, production or thermal energy recovery operations. The offshore structure comprises a plurality of buoyant columns, which can be three or more in number, with permanent ballast or water ballast in the lower portion of the structure so as to place, its center of gravity below center of buoyancy. The structure has a deep draft, with the major volume thereof being located below the influence of the surface wave action. The water plane is spread into several distinct segments substantially increasing the metacentric height. As a result, the structure has an inherent absolute stability and minimal response to surface waves.

A plurality of horizontal bracing members fixedly joins the columns at selected vertical locations along the columns. The bracing members retain the columns in a spaced apart relationship in a geometric configuration, such as for example a triangle in a three-column structure. Each column has a cylindrical outer shell with reinforced walls. In the preferred embodiment, the reinforcement is provided by corrugated panels inside the shells or, alternatively, by stiffeners mounted in the vertical direction about the inner circumference of each column. Ring frames are used to reduce the spans of the corrugations or stiffeners and maintain the cylindrical shape of the shell. The columns are divided into a plurality of watertight independent compartments.

The spaced columns provide transparency to surface wave motions, making the structure less affected by surge and drift motions induced by ocean waves. Additionally, the spread relationship of the columns increases the metacentric height and renders the structure less responsive to wave forces inducing roll and pitch motions.

The columns and the bracing members, which can be either horizontal or a combination of horizontal and diagonal, provide sufficient moment of inertia of the water plane, or water plane inertia, for short, to minimize motions of the platform and make it a suitable support for operations thereon. The buoyancy of the structure can be adjusted by liquid ballast to maintain the deck above the level of maximum wave height expected at a particular location. The independent columns provide ballast compartments at large lever arms from the center of buoyancy; water ballast can be transferred to accommodate eccentricities of topside (upper deck) center of gravity and/or operational loads.

In order to deploy the structure on site, the deck is towed separately to the selected location, while the hull, column array, is floated horizontally, with columns on their sides, to a selected location from a fabrication yard. The columns are towed using their own buoyancy, without the need for a cargo derrick or barge, which provides significant cost savings to the platform owner. Once delivered on site, the columns are ballasted and upended in a fashion similar to the upending of deepwater jackets. The deck is then positioned atop the hull (columns), secured to the columns, and the hull is deballasted, elevating the deck to the operational level.

BRIEF DESCRIPTION OF THE DRAWINGS

Reference will now be made to the drawings, wherein like parts are designated by like numerals, and wherein

FIG. 5 is a top view of individual pre-formed corrugated plate panel stiffeners to be used in the shell of a vertical caisson.

FIG. 6 is a cross-sectional view of an individual caisson with corrugated stiffeners and the ring frame.

FIG. 7 is a cross-sectional view of a corrugated plate panel stiffener affixed to a shell plate and the ring frame of a vertical caisson.

FIG. 8 is a cross sectional view of an individual column with vertical stiffeners affixed to the shell plate and the ring frame of a vertical caisson; and FIG. 9 is a sectional view illustrating the stiffener members attached to the ring frame.

DETAILED DESCRIPTION OF THE PREFERRED EMBODIMENT

Figure 1:
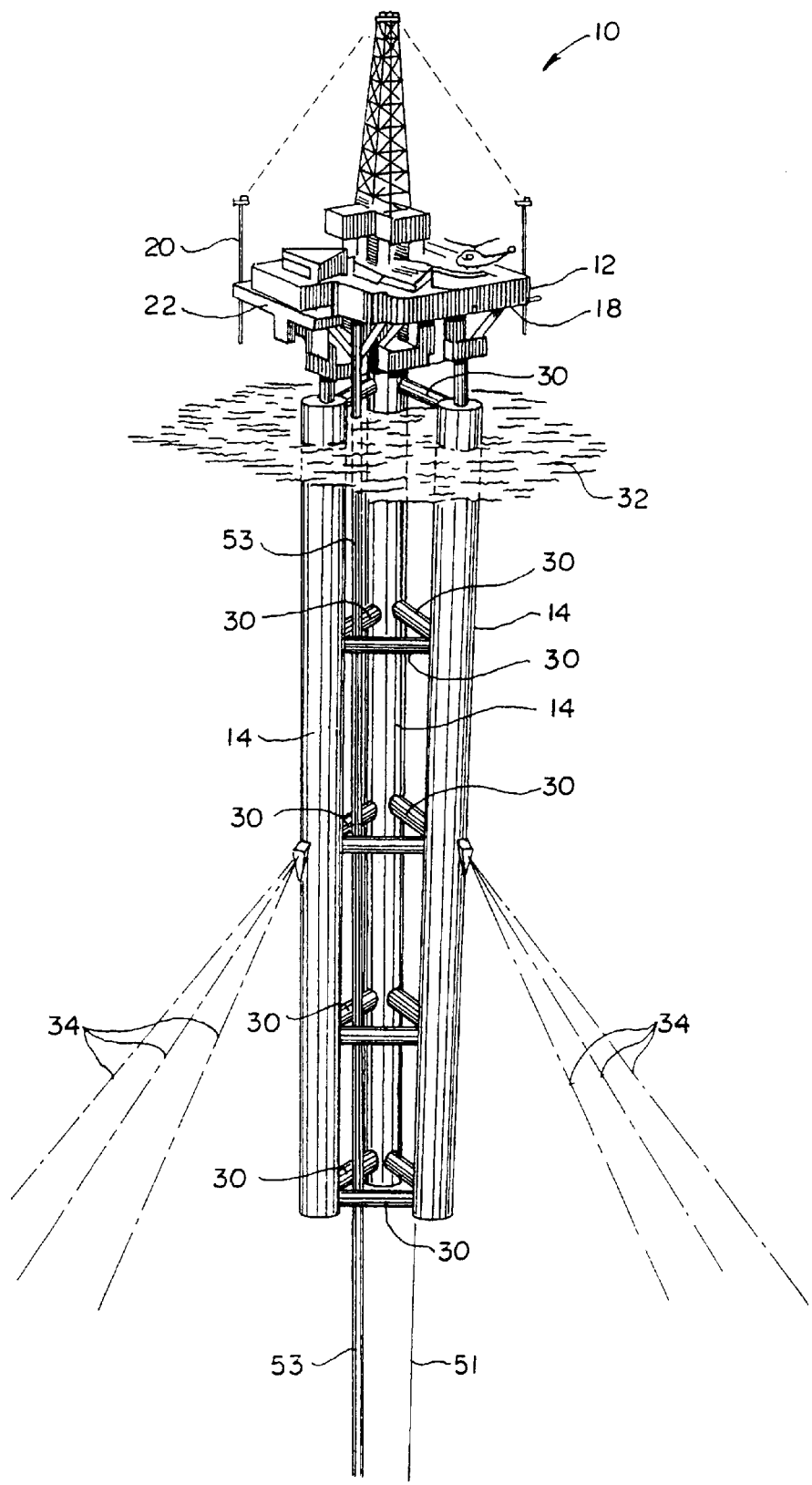
FIG. 1 is a perspective view of the offshore structure in accordance with the present invention.

Turning now to the drawings in more detail, numeral 10 designates the first embodiment of the offshore structure in accordance with the present invention. The structure 10 comprises a plurality of buoyant caissons, or columns 14 spaced geometrically in, for example, a triangular configuration. Of course, more than three columns 14 can be used, if desired, depending on the design characteristics of a particular structure.

The columns 14 are formed as buoyant caissons submerged below the water surface 32 to a depth sufficient to remove the majority of caisson volume from the influence of surface waves. It is envisioned that this submerged portion of the caisson would occupy between 67% to 90% of the length of the columns 14.

The columns 14 provide buoyancy to the structure 12 so as to support the structure 12 well above the level of maximum expected wave motion in stormy conditions. The platform 12 can be used as a drilling or production facility with a conventional derrick 16, living quarters 18, drilling facilities 20 and floatation facilities 22.

If desired, the drilling facilities can be combined with production facilities, or the entire platform 12 can serve for thermal energy recovery or other operation in deep ocean waters. Regardless of the intended purpose of the platform 12, the design results in a statically stable structure with minimum movement.

An important feature of the structure 10 is that its center of gravity is below its center of buoyancy, contrary to conventional floating moored structures. Due to this characteristic, the structure 10 has an inherent absolute stability, capable of supporting over-water operations for many applications.

To ensure that the center of gravity of the structure 10 is below its center of buoyancy, permanent ballast or a combination of permanent and variable controlled temporary ballast(s) are introduced into the lower portions of the caissons 14. The ballast can be provided by heavy solid materials, such as anchor chain, steel scrap, concrete or other materials, liquid or solid. Of course, removable ballast is preferred, as it will make relocation of the structure 10 easier, when necessary. The inherent absolute stability of the unit makes it more resistant to wind or other overturning moments.

Figure 2:
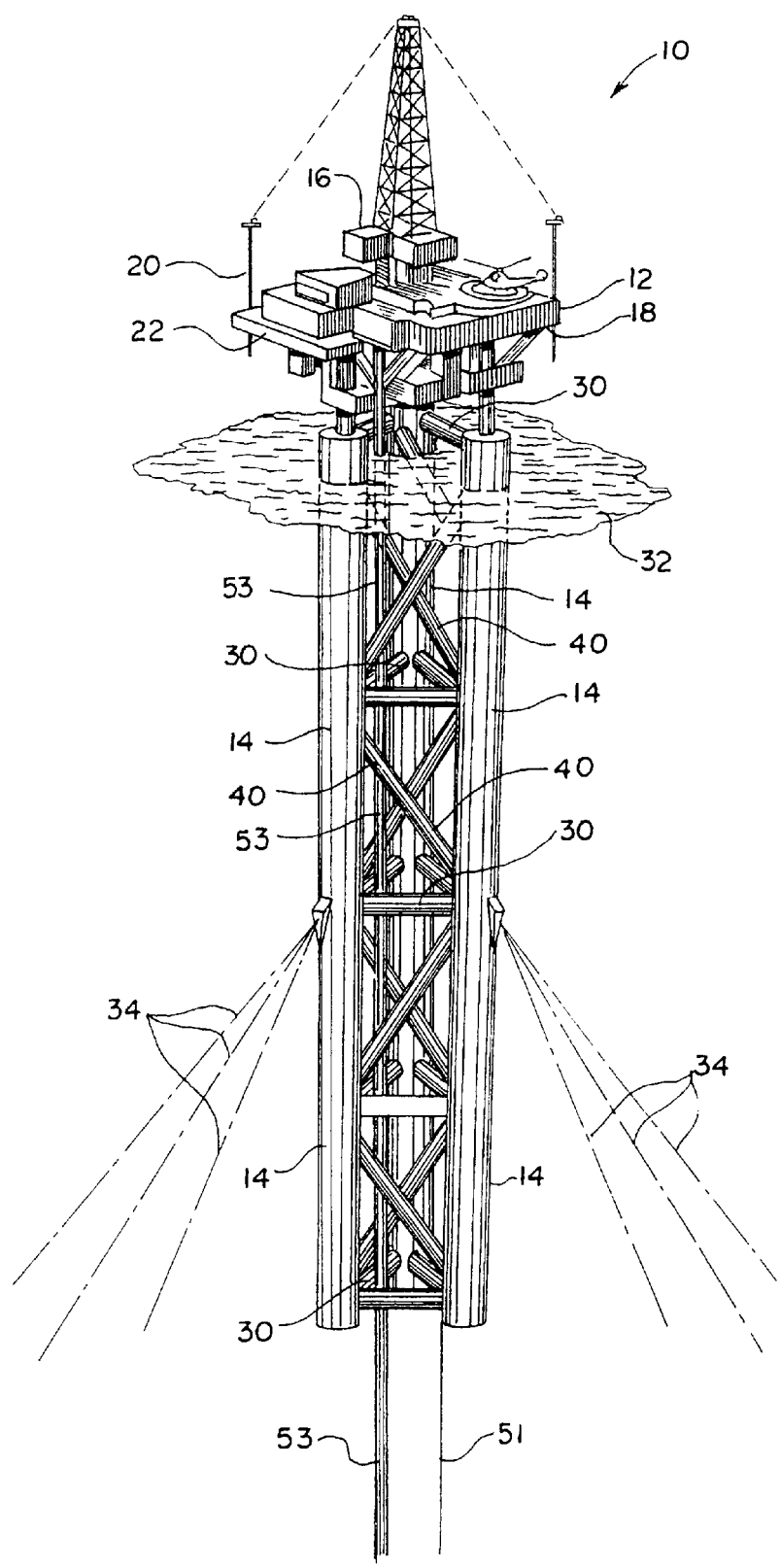
FIG. 2 is an alternative embodiment of the offshore structure of the present invention equipped with diagonal bracing between the columns.

As can be further seen in FIGS. 1 and 2, the caissons 14 are interconnected by a plurality of horizontal braces 30 which are spaced about the vertical length of the caissons and contribute to the water plane area of the structure 10. The horizontal interconnecting bracing members 30 provide a significant heave damping which is important in deep water environment. The structure 10 can be provided with only horizontal bracing members 30 (as shown in FIG. 1), or with a combination of horizontal and diagonal bracing members 40 (alternative embodiment shown in FIG. 2).

As further shown in FIG. 1, the structure 10 is moored by a conventional flexible catenary means 34 which can be all chain, a combination of chain and wire, or all wire mooring system. It is also possible to provide a taut mooring system with metal or nylon fairleads. It a three-column structure nine mooring lines can be provided, each caisson supporting three mooring fairleads.

The mooring lines can be connected to conventional anchors moored in the sea floor (not shown), bearing in mind that structure 10 is designed to operate in water depths of between 1,000 ft to 10,000 ft. All mooring lines 34 are conventionally deployed and can be conventionally retrieved when the structure 10 needs to be removed from one location and transferred to another location. As a result, the structure 10 has advantage of easy mobility between locations. The cost savings afforded by complete retrieval of the components of the structure 10 increase cost effectiveness of the unit.

The caissons or columns 14 are spaced equidistantly from adjacent columns. In the illustrative embodiment, the structure 10 has three columns arranged in a generally triangular configuration. Of course, other geometric configurations can be successfully employed. For example, the structure may be provided with four caissons or columns 14 arranged in a square configuration; or a plurality of columns can be used arranged in a polygonal or circular relationship to each other.

The areas between the columns 14 are transparent to wave motions, which reduces the loading on the columns 14, particularly in comparison with a single large caisson found in some of known caisson units that have equal displacement. Further, the spread relationship between the columns increases water plane inertia and, consequently, the metacentric height, which improves stability of the structure, making it more resistant to rolling and pitching.

The upper ends of the columns 14 carry a caisson connecting member, or stub 36, which at its upper end 38, is fixedly attached to the lower deck 24. The resultant structure, with the bracing members 30 interconnecting the vertical columns 14 is rigid, capable of moving relatively free in a horizontal, as well as vertical direction. However, due to the ballast in the lower portions 42 of the caissons 14, the pitch or roll motions are minimized. The platform, of course, will be subjected to the same forces and overturning moments as those acting on individual columns. The combined submerged structure, however, provides significant inertia to resist roll and heave in response to surface wave forces.

Figure 3:
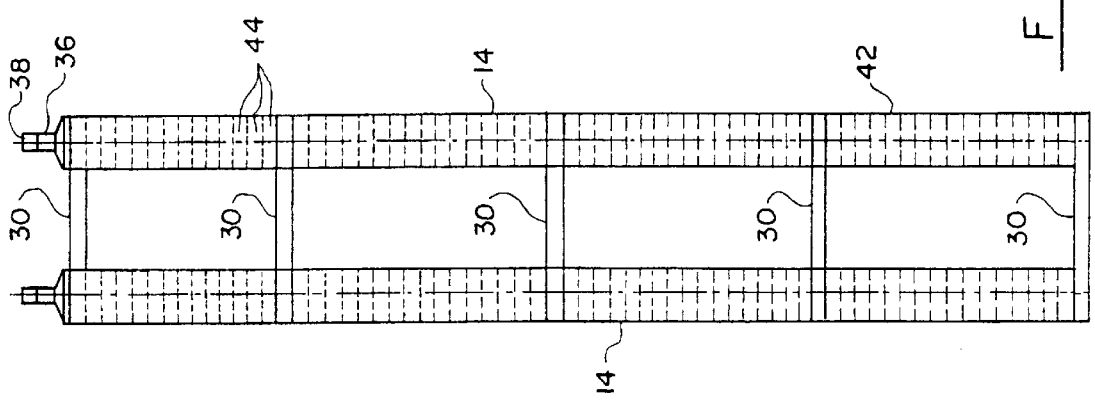
FIG. 3 is an elevation view of the vertical caisson and brace assembly.

FIG. 3 illustrates a division of the column space into a plurality of inner watertight compartments 44 that can be used to store drill water, potable water, ballast, fuel oil, machinery and the like. The ballast in the lower portion 42 gives the structure 10 a pendulum stability that cannot be achieved in conventional semi-submersible or other floating units A plurality of drilling or production risers 48 extend in the space between the columns 14, partially shielded from wave action by the caissons. Sales risers 51 and export lines 53 likewise extend in the space between the columns 14 and the bracing members 30, as can be better seen in FIG. 1.

Figure 4:
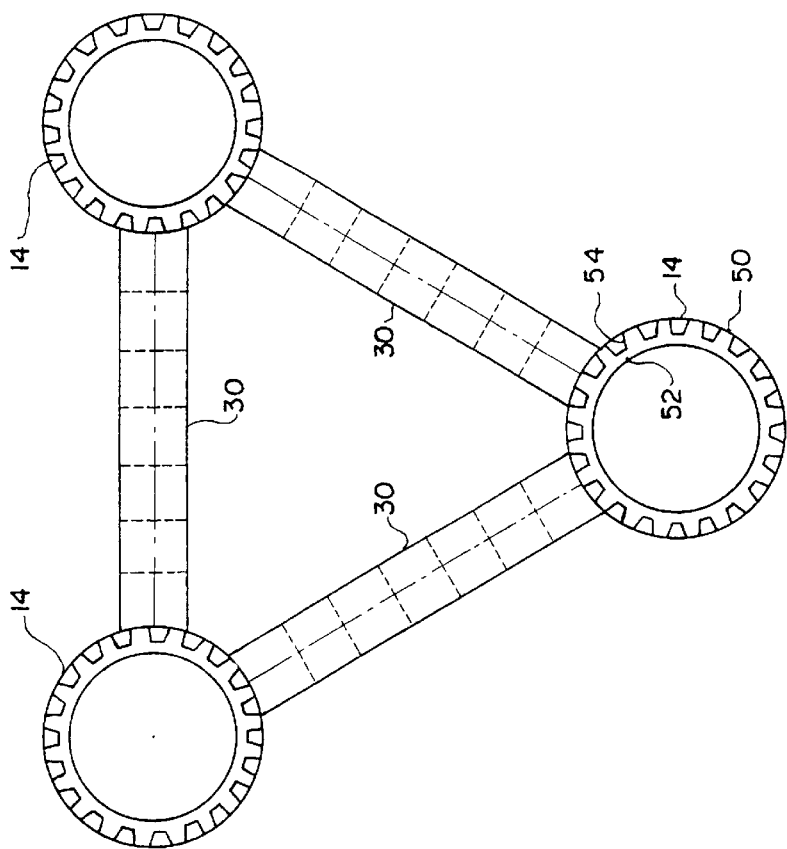
FIG. 4 is a sectional view illustrating three vertical caissons connected by bracing members.

Turning now to FIGS. 4—9, the structure of an individual caisson will be discussed in more detail. As can be seen in FIG. 4, each caisson compartment 44 has an outer shell 50, within which a ring frame 52 extends through substantially entire length of the compartment. Corrugated panels 54 are fitted about the interior circumference of the shell 50, in a longitudinal fashion, rigidly attached to the shell 50 by welding or other similar means. The corrugated panels 54 can be U-shaped in cross section, as shown in FIG. 5, with a pair of outwardly extending flanges 56 integrally connected to the U-shaped general frame of the panel 54.

Stiffeners 60 (FIGS. 8 and 9), similarly welded to the interior of the shell 50 can substitute the corrugated panels. As shown in FIGS. 7 and 9, the corrugated panel 54 or stiffener 60 is welded at 56 to the shell 50, and to the ring frames 52 and 62, respectively, in a side-to-side arrangement, with one panel being positioned above and another below the ring frames 52 and 62.

The caissons 14 are fabricated at a conventional fabrication yard from a combination of plate and corrugated plate panel stiffeners. First, the external shell is formed into a cylindrical, or segments thereof shape, and then the preformed corrugated plate panels or stiffeners are laid onto the shell and welded to each other and to the shell 50. The shell and the stiffener assemblies are then joined to form a complete can. The can sections are then welded to ring frames 52 and 62. The complete caisson structure is made up of similar can sections. It is preferred that the lower portions of the caisson 14 have greater wall plate thickness to withstand the water pressure in deeper environment.

The resultant structure 10 has an inherent absolute stability due to the center of gravity being lower than the center of buoyancy. Unlike conventional semi-submersible units which simply rely upon water plane displacement for stability or upon bottom fastened tendons, the structure 10 is stable due to the low center of gravity, resulting from deep draft and placement of solid or liquid ballast in the lower portions of the structure. The smaller cross sectional areas of the columns and their spacing from one another result in a substantially improved wave transparency and minimal response to surface waves. The deep draft that places most of the structure below the water surface and into the relatively still waters at depths in excess of 500 ft. minimizes reaction to surface changes, greatly reducing heave and angular pitch of the unit 10. As a result, a stable structure is provided to support the superstructure 12 that resists wave induced forces thereon.

The second embodiment of the present invention illustrated in FIG. 2 provides for the use of optional diagonal bracing members 40 extending between the sections of the columns 14 defined by horizontal braces 30. It is envisioned that diagonal bracing members 40 will be of a particular advantage to units deployed in the areas having traditionally high waves and strong winds. The unit of the second embodiment possesses the same characteristics as described above in providing inherent absolute stability to the deck supporting structure 10, which is secured and supported by the vertical columns 14.

The offshore structure 10 can be transported to a deployment site by moving the deck supported superstructure 12 separately from the buoyant columns 14. The column stack is floated horizontally, with columns 14 on their sides, and towed to the selected location under its own floatation.

Once the elements of the structure arrive at the site, the columns 12 are ballasted, so that the lower portions of each of the columns move below the water surface to a deep draft position. The structure 12 is then maneuvered to the top of the columns and fixedly secured such as by welding, to the connecting members 36. Part of the ballast is then released from the columns 14, so that the columns move vertically to a position supporting the platform 12 above the height of maximum wave motions for that location. Conventional techniques are then employed to lower risers and moorings to the seabed of water and for flexible catenary or taut mooring of the structure at the desired location.

Once it becomes necessary to relocate the structure 10 to another location in deep waters, raiser pipes and the mooring lines 34 are retrieved, and the structure 10 can be slowly moved in a buoyant floating condition to the new location. In this manner, the cost effectiveness of the structure 10 is significantly improved, in comparison with conventional fixed platforms, tension leg platforms or with other structures presently in use that do not benefit from the combined stability of the structure according to the present invention.

It is envisioned that the structure can be made longer to further lower the center of gravity. Lower portions of the structure or connecting girders can be made larger to receive dense ballast and provide lower level weight. Also, ballast can be made external to the columns 14, by for example, forming large cement components and securing the blocks to the lower ends of the columns 14. The suspended extruded blocks will lower the center of gravity, as required for the practice of the present invention. The ballast blocks can be released in order to more easily salvage the unit at the end of its life.

The compartmentation within each caisson can be adjusted with ballast to compensate for eccentric loading from topside weight, environmental loadings or operational loads.

Many other changes and modifications can be made in the design of the present invention without departing from the spirit thereof. We, therefore, pray that our rights to the present invention be limited only by the scope of the appended claims.

In the claims:

1. A deep draft semi-submersible floating structure, comprising:
    a plurality of independent vertical buoyant columns having individual ballast means for accommodating eccentricities of a deck supported by upper portions of said columns and/or operational loads so as to prevent mutual load transfer between said columns, each of said columns comprising a cylindrical outer shell reinforced with corrugated stiffening panels secured to an interior surface of said outer shell and extending through substantially entire length of each of said columns and a ring frame mounted in a concentric relationship to said outer shell a distance away from said stiffening panels;
    a plurality of horizontal bracing members positioned between said columns at a plurality of vertical locations along said columns for retaining said columns in a spaced-apart relationship to each other; and
    wherein a center of gravity of said structure is maintained below a center of buoyancy.

2. The apparatus of claim 1, further comprising a ring frame retaining said stiffening panels about an interior circumference of each of said columns, and wherein said stiffening panels are mounted between said outer shell and said ring frame.

3. A deep draft semi-submersible floating vessel, comprising:
    at least three independent vertical buoyant caissons, each of the caissons having individual ballast means, upper portions of said caissons supporting at least one deck suitable for conducting afloat operations, said caissons being spaced from each other to provide wave transparency for damping wave induced motions of said vessel and said ballast means accommodating eccentricities acting on the deck and/or operational loads so as to prevent mutual load transfer between said caissons, each of said caissons comprising a cylindrical outer shell and a means for reinforcing said outer shell mounted about an inner circumference of each of said caissons;

a plurality of bracing members fixedly connected to said caissons at a plurality of spaced vertical locations along the length of said caissons, said caissons and said bracing members providing sufficient water plane inertia to said vessel to provide stability of the vessel deployed at an offshore location; and wherein a center of gravity of said vessel is maintained below a center of buoyancy of the vessel.

4. The vessel of claim 3, wherein said reinforcing means comprises a ring frame positioned within said outer shell and a corrugated panel mounted between an inner wall of said outer shell and the ring frame.

5. The vessel of claim 3, wherein said reinforcing means comprises a ring frame mounted inside said outer shell and a stiffening member secured in an annular space between said ring frame and an inner wall of said outer shell.

* * * * *